United States Patent [19]
Hecht

[11] Patent Number: 6,109,152
[45] Date of Patent: Aug. 29, 2000

[54] CUTTING TOOL ASSEMBLY

[75] Inventor: Gil Hecht, Hadera, Israel

[73] Assignee: Iscar Ltd., Migdal Tefen, Israel

[21] Appl. No.: 09/067,960

[22] Filed: Apr. 29, 1998

[30] Foreign Application Priority Data

May 2, 1997 [IL] Israel ......................................... 120763

[51] Int. Cl.$^7$ .................................................. B23B 29/04
[52] U.S. Cl. .............................. 82/160; 407/33; 407/31; 409/234; 408/239 R
[58] Field of Search ...................... 82/160; 408/239 R, 408/161, 181, 182, 713; 409/234; 407/31, 32, 33, 30, 38, 40, 44, 46, 47, 48, 53, 73, 77, 87, 92, 93

[56] References Cited

U.S. PATENT DOCUMENTS

| | | |
|---|---|---|
| 1,160,042 | 11/1915 | Carpenter ............................... 407/33 X |
| 4,575,293 | 3/1986 | Berti ......................................... 409/234 |
| 4,655,631 | 4/1987 | Mitchell . |
| 4,655,655 | 4/1987 | Schurfeld ............................. 82/160 X |
| 4,714,390 | 12/1987 | Eckle et al. ............................. 409/234 |
| 4,813,831 | 3/1989 | Reinauer ............................... 82/160 X |
| 4,836,706 | 6/1989 | Mitchell . |
| 5,116,194 | 5/1992 | Pfalzgraf et al. . |
| 5,468,102 | 11/1995 | Stojanovski . |
| 5,607,263 | 3/1997 | Nespeta et al. . |

FOREIGN PATENT DOCUMENTS

| | | |
|---|---|---|
| 256 128 | 5/1984 | China . |
| 0065659 | 12/1982 | European Pat. Off. ................. 82/160 |
| 0 501 636 A1 | 9/1992 | European Pat. Off. . |
| 190014 | of 0000 | France . |
| 3402547 A1 | 8/1985 | Germany . |
| 4026651 | 2/1992 | Germany . |
| 301619 | of 0000 | Japan . |
| 446 013 | 3/1968 | Sweden . |
| WO 94/23874 | 10/1994 | WIPO . |

OTHER PUBLICATIONS

Official Notification dated Sep. 16, 1999 from Israeli Application No. 106009.4.

Primary Examiner—Henry W. H. Tsai
Attorney, Agent, or Firm—Pennie & Edmonds LLP

[57] ABSTRACT

A cutting tool assembly wherein a cutting head is releasably retained by a tool holder by using of interacting coupling members, with one of the coupling members being inserted into a cavity of the other coupling member, with radially extending abutment wings of said one coupling member passing respectively between successive support wings of the other coupling member, rotation of the one coupling member resulting in the abutment wings abutting and resting on the support wings, thereby effecting a retaining coupling between said cutting head and said tool holder.

34 Claims, 8 Drawing Sheets

CUTTING TOOL ASSEMBLY

FIELD OF THE INVENTION

The present invention relates to a cutting tool assembly of the kind having a replaceable cutting head.

BACKGROUND OF THE INVENTION

Such cutting tool assemblies have long been known particularly where the cutting head is replaceably retained in or on a tool holder by screw clamping. With most of such known assemblies handling difficulties are often encountered when removing or replacing the cutting head, seeing that this usually involves loosening, removal and screw insertion of the clamping screw, whilst at the same time holding the cutting head. Additionally, with many types of cutting tools the clamping screw is very often called on to absorb a significant portion of the torque load exerted on the cutting head when in use.

These problems become particularly acute in the case of miniature cutting tools. Such miniature cutting tools are in general used for internal and external machining such as, for example, in turning, milling, grooving, drilling, etc. These tools are in general constituted by a hollow shank of which a front, elongated shank portion is of relatively small diameter (for example, 6 to 14 mm).

In general, the cutting head is releasably screw coupled to a front leading end of the front shank portion. Such a tool is disclosed, for example, in International Application Serial No. WO 94/23874.

With such an arrangement, the coupling screw must be capable of withstanding the torque load arising out of the axial pre-load originating with the screw mounting of the cutting head on the front shank portion. Furthermore, with increasing reduction in size of the cutting head, smaller and smaller coupling screws have to be used, with consequent danger of the screw being sheared off as the torque forces increase. In addition, the use of such small screws requires equally small turning keys. It will be realized that with such small keys the tightening force which can be exerted is very limited. Such small keys are also subject to easy fracture and wear.

Replacement and fitting of the cutting head involves handling of the screw which can be very diminutive, and it can readily fall and get lost, as is also the case with the very small cutting heads and tightening keys.

It has been proposed in DE 3402547 to produce a cutting tool wherein the cutting head continues to be screw coupled to the front tool shaft but wherein, by virtue of the fact that radially formed ribs on an undersurface of the cutting head mate within correspondingly radially formed grooves on the adjacent surface of the front shaft, the rib and groove arrangement take up the torque forces and this, of course, reduces the stress on the coupling screw. Nevertheless, the use of such a coupling screw, and especially a diminutive screw, is subjected to the disadvantages referred to above.

In an alternative embodiment of a cutting tool disclosed in DE 4026651, the cutting head is fitted to the tool holder via an elongated draw rod which extends through the front shaft portion into a hollow region in the rear shaft portion and is effectively keyed against rotation with respect to the shaft. The draw rod is coupled to a gripping mechanism located in the rear shaft portion and accessible therefrom for retaining the cutting head against the front shaft portion or for displacing it away therefrom. Here, torque forces are taken up by the relatively narrow draw rod adjacent the front end of the shaft, whilst retention and release of the cutting head is by way of a relatively complicated gripping mechanism.

It is an object of the present invention to provide a new and improved cutting tool assembly wherein the above-referred-to difficulties and disadvantages in coupling and uncoupling the cutting head to the tool holder are significantly reduced.

BRIEF SUMMARY OF THE INVENTION

According to the present invention there is provided a cutting tool assembly comprising a cutting head to be releasably retained by a tool holder, wherein said tool holder and said cutting head are provided with interacting coupling members, one of which is formed within an open ended cavity, the coupling member of the tool holder having a plurality of radially extending abutment wings, and the coupling member of the cutting head having a corresponding set of spaced apart, peripherally located, radially directed support wings, the arrangement being such that a retaining coupling of said cutting read to said tool holder is effected upon insertion of one of the coupling members into the cavity of the other coupling member with said abutment wings passing respectively between successive support wings and rotating said one coupling member so that said abutment wings abut and rest on said support wings, thereby effecting a retaining coupling between said cutting head and said tool holder.

Preferably, the displacing means is screw actuated and is screw mounted in said tool holder so as to act on said coupling element, whereby screw rotation of said means in opposite senses results in said oppositely directed axial displacements.

In accordance with a preferred embodiment of a cutting tool assembly in accordance with the invention and involving a miniature cutting tool, the latter comprises integrally formed rear and front hollow shank portions, the front shank portion being elongated and being of substantially lesser radial dimensions than that of the rear shank portion; a cutting head releasably centered and keyed against rotation with respect to a free end of said front shank portion; an elongated draw rod extending through said front shank portion for coupling at one end thereof to said cutting head and rigidly coupled at an opposite end thereof to a body slidably located in said rear shank portion so as to be co-directionally displaceable with said draw rod in an axial direction of said rear shank portion; and screw actuating means screw mounted in said rear shank portion so as to bear on said displaceable body so that screw rotation of said means in opposite senses results in displacement of said body respectively away from and towards said cutting head so as respectively to clamp and release said cutting head to and from said front shank portion.

Preferably, spring biasing means are provided to spring bias the body towards the cutting head into releasing the cutting head from the front shank portion, said screw actuating means comprising a screw having an inner end bearing on said body so that inwardly directed screw rotation of the screw imparts to the body a displacement away from said cutting end and against the spring biasing.

In accordance with a still further embodiment of the invention, the axially displaceable body is formed with a transversely extending cavity having oppositely sloping cam follower surfaces located at transversely spaced apart locations of the cavity, the screw actuating means comprising an elongated cam member extending through the cavity and being formed at transversely spaced apart locations thereof with oppositely sloping cam surfaces in respective sliding relationship with the cam follower surfaces, the screw actuating means being screw displaceable inwardly and outwardly in the cavity so as to give rise to relative sliding displacements of juxtaposed pairs of cam and cam follower surfaces with consequent displacement of the body member towards and away from the cutting head.

With the latter embodiment, the cam follower surfaces respectively define a pair of transversely spaced apart conical recesses included within the cavity, the cam surfaces being respectively constituted by a pair of transversely spaced apart conical surfaces of the cam member.

With a miniature cutting tool in accordance with the invention, the fact that the cutting head is keyed to the front shaft portion means that all torque forces are taken up by this front shaft portion and not by any intermediate screw coupling. Furthermore, the entire mechanism for ensuring the effective clamping and releasing of the cutting head from the front shank portion is located in a readily accessible location in the rear shank portion and, by virtue of a simple screw motion, in one sense effective clamping of the cutting head against the front shaft portion is effected, whilst screw motion in the opposite sense ensures the release of the cutting head from the front shaft portion, either under the influence of a compression spring or by virtue of relative movement of a cam follower on a cam surface. By virtue of the fact that retention of the cutting head on the draw rod is by way of a bayonet-type coupling, release of the cutting head from the draw bar can be effected by a simple rotary motion, without the problems involved in releasing and retaining a screw of diminutive size.

BRIEF DESCRIPTION OF DRAWINGS

For a better understanding of the present invention and to show how the same may be carried out in practice, there will now be described, by way of example, a miniature cutting tool in accordance with the present invention, with reference to the accompanying drawings, in which.

DETAILED DESCRIPTION OF PREFERRED EMBODIMENTS

Figure 1:
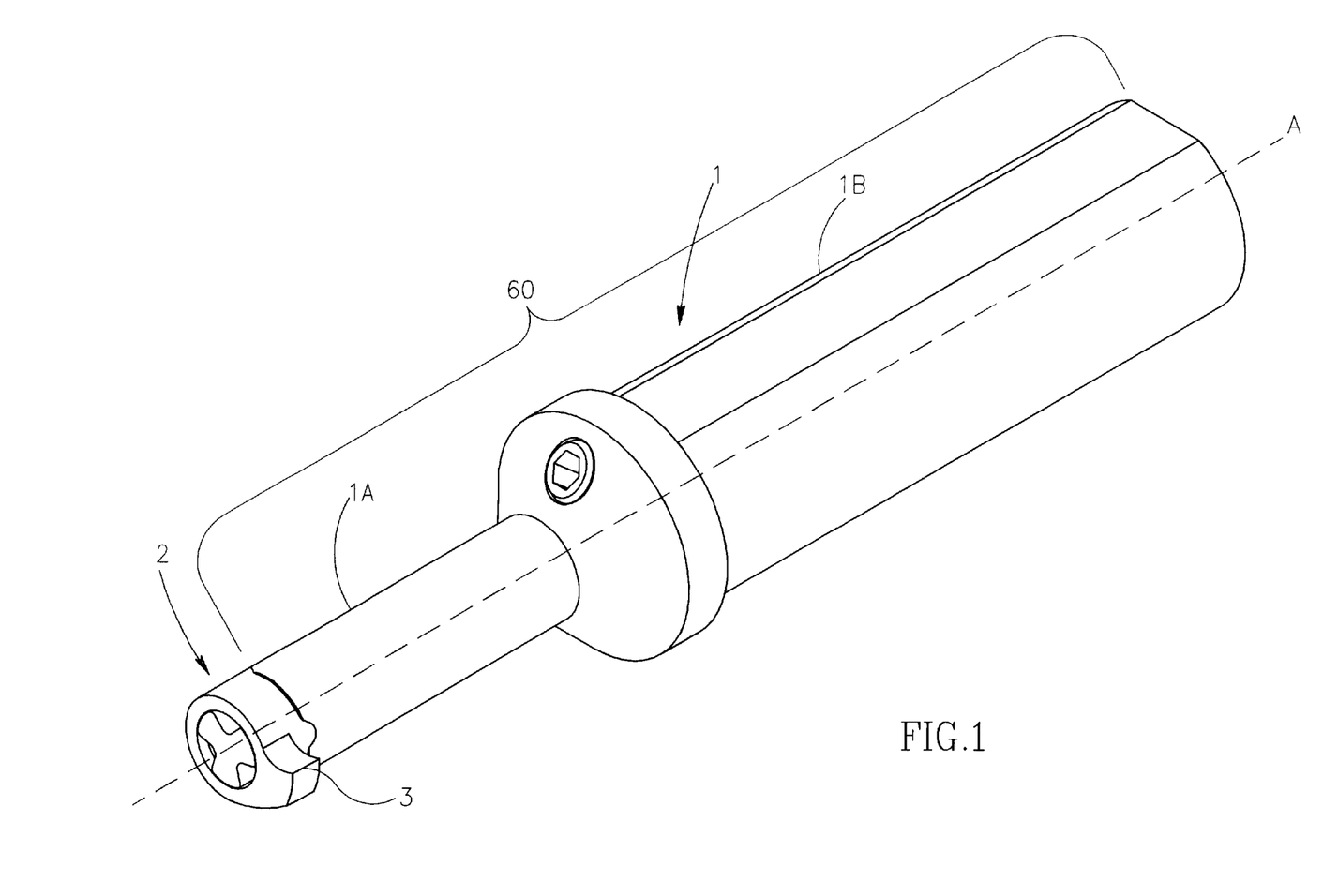
FIG. 1 is a perspective view of a first form of cutting tool assembly in accordance with the present invention being an assembled miniature cutting tool.
Figure 2:
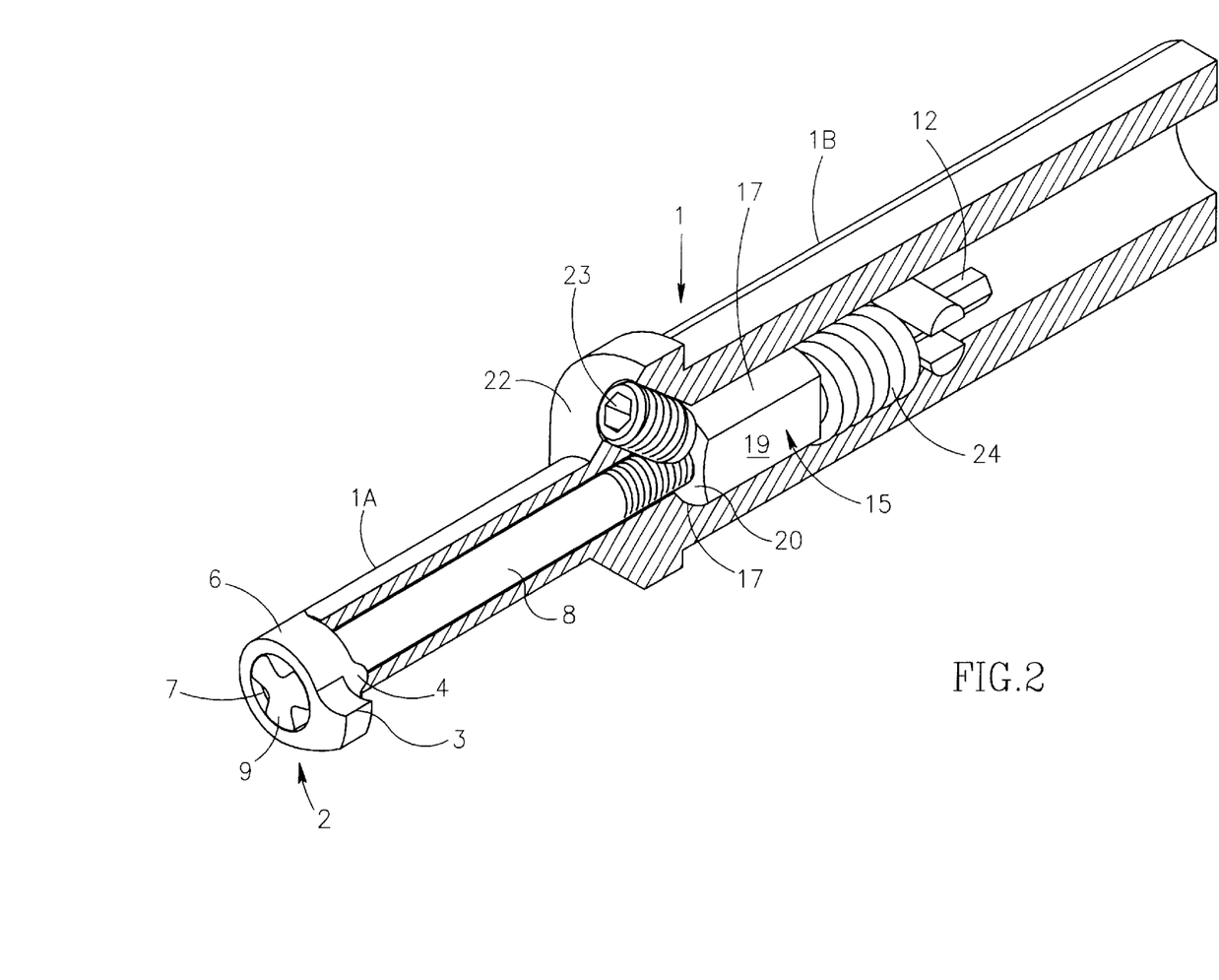
FIG. 2 is a partially longitudinally sectioned, perspective view of the assembly shown in FIG. 1.
Figure 3:
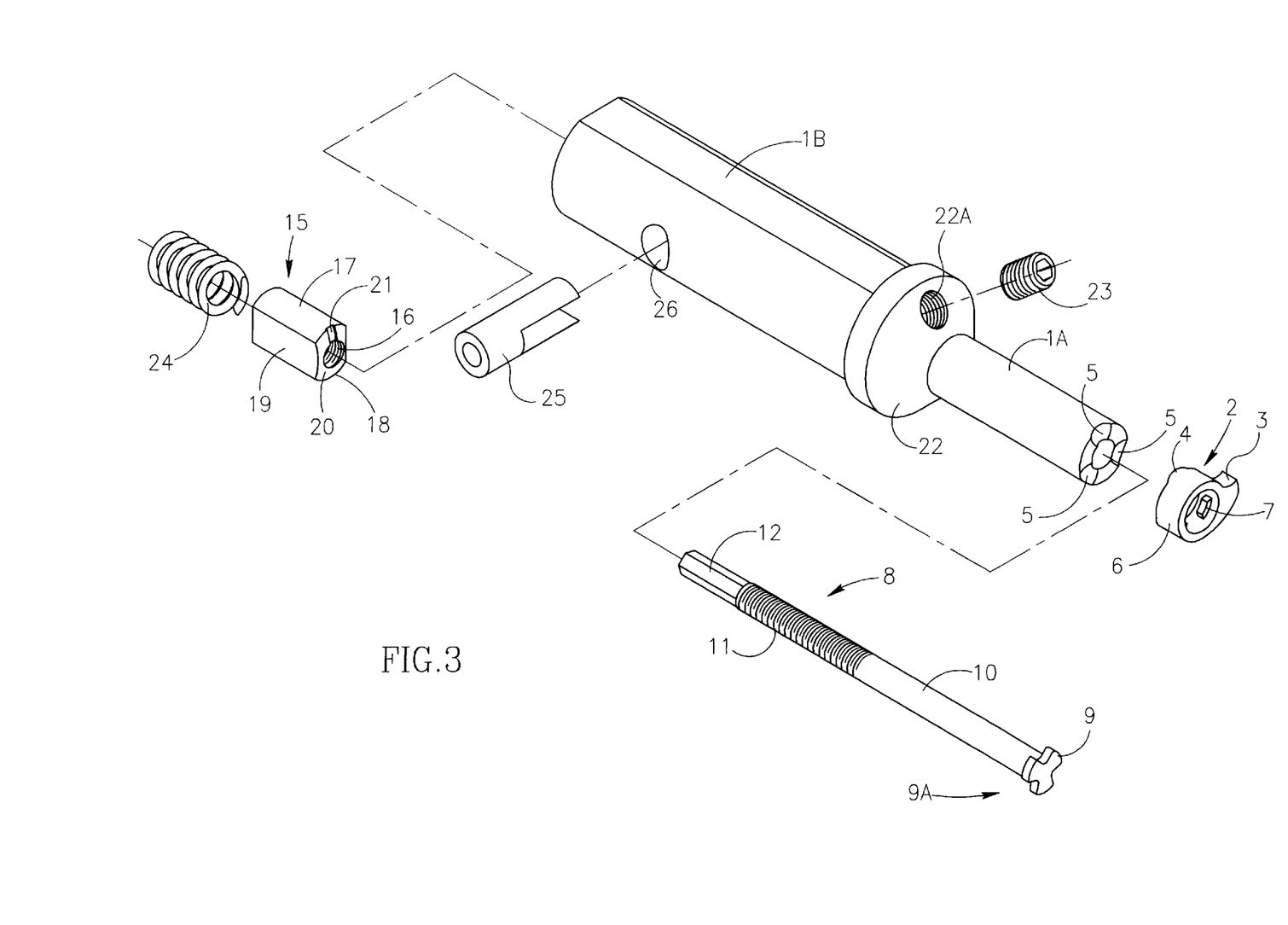
FIG. 3 is an exploded view of the assembly shown in FIGS. 1 and 2.

As seen in FIGS. 1, 2 and 3 of the drawings, a miniature cutting tool assembly designed, for example, for use in internal machining comprises a tool holder 60 and a cutting head 2 arranged along a longitudinal axis A. The tool holder comprises a shank 1 having a tubular front shank portion 1A formed integrally with a hollow, cylindrical rear shank portion 1B, the front shank portion 1A being of significantly lesser radial dimensions than the rear shank portion 1B.

As can be clearly seen from FIGS. 2, 3, 4 and 5 of the drawings, the cutting head 2 has a radially extending cutting blade 3 and a base surface provided with three radially distributed, dome-like keying projections 4. The projection 4 are designed to fit into correspondingly formed, dome-like radially distributed keying recesses 5 formed in a terminal edge of the front shank portion 1A such that, when the cutting head 2 is fitted against the terminal edge of the front shank portion 1A, it is centered with respect to the front shank portion 1A and keyed against relative rotation with respect thereto.

The cutting head 2 comprises, in addition to the cutting blade 3 and the keying projections 4, an essentially cylindrical body portion 6 defining an open-ended cavity 6A, on an inner wall of which are formed a plurality of spaced-apart, peripherally located, radially and inwardly directed support wings 7. The plurality of support wings 7 form a coupling member 62 of the cutting head 2.

An elongated draw rod 8 forming a coupling member of the tool holder, is formed at one end thereof with a coupling element having a corresponding set of spaced apart radially extending abutment wings 9 which lie on a circle smaller than the inner diameter of a cylindrical cavity formed in the body portion 6, each wing having a peripheral extent such as to allow for ready introduction between the support wings 7.

The elongated draw rod 8 comprises a first portion 10 of substantially cylindrical shape adjacent the abutment wings 9, a central, elongated, threaded portion 11 and a terminal portion 12 of substantially polygonally cross-sectional shape.

An elongated, axially displaceable body member 15 is formed with a through-going threaded bore 16 which the draw rod 8 can be screw inserted and is formed with a pair of opposite circular cylindrical surfaces 17 and an opposite pair of substantially planar side surfaces 19.

Formed in a leading end surface 20 of the body member 15 is a radially extending groove 21. The groove 21 is advantageously of V-shaped cross-section, whether with a substantially flat base or otherwise. Such a shape is particularly useful in preventing undesired screw release during cutting.

Figure 4:
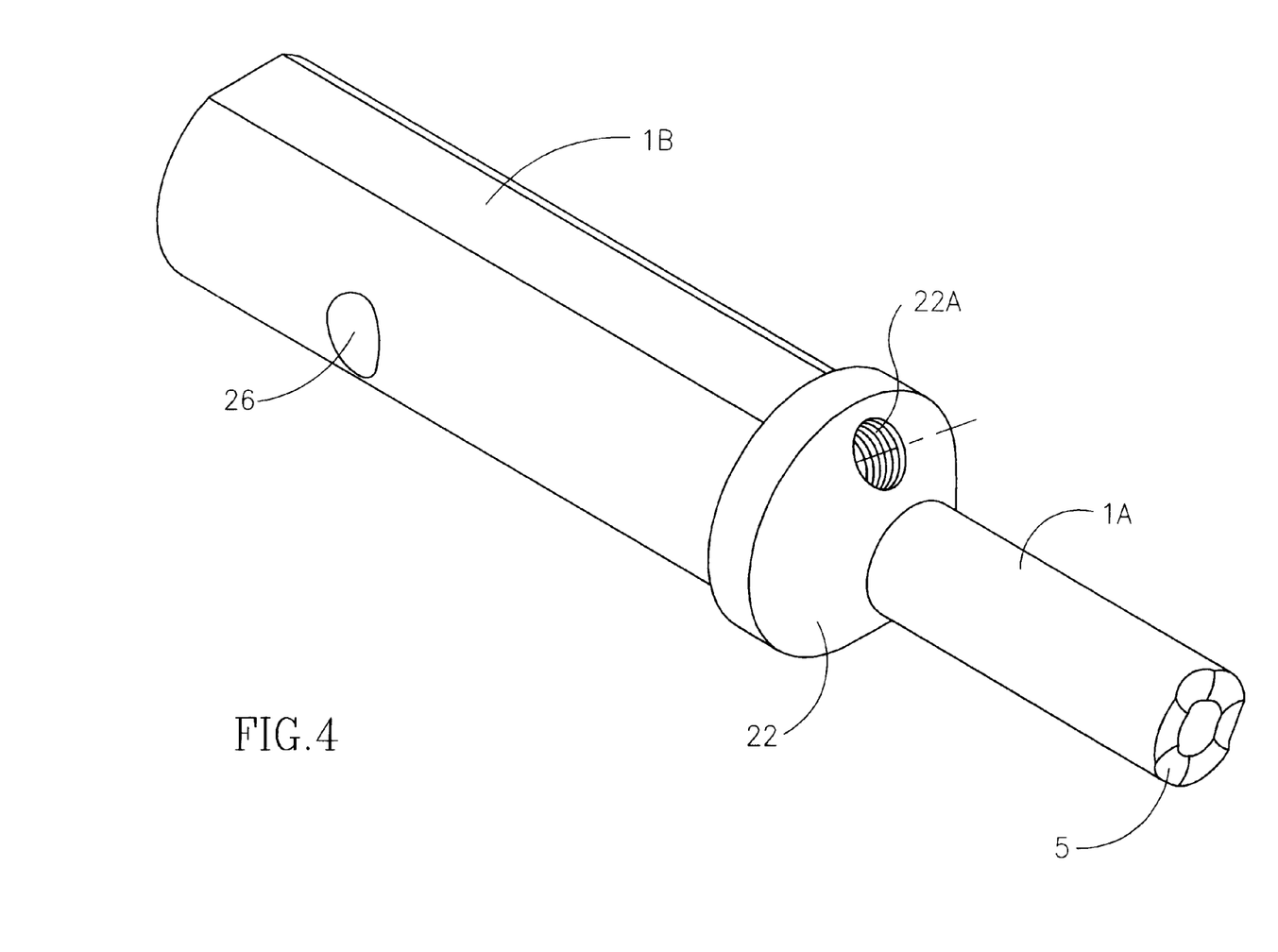
FIG. 4 is a perspective view of a shank of the tool assembly shown in the preceding figures.
Figure 5:
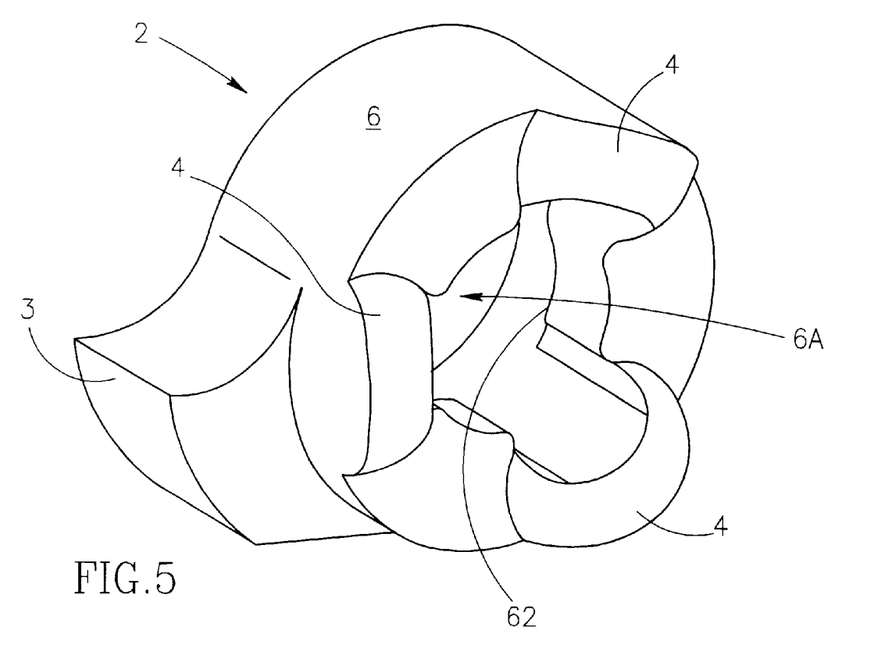
FIG. 5 is a perspective view from below of a cutting head incorporated in the tool assembly shown in FIGS. 1 to 3.

The shank 1 is provided with an intermediate portion 22 which separates the front shank portion 1A from the rear shank portion 1B, there being formed in the intermediate portion 22 a threaded bore 22A into which an adjustable screw 23 can be screwed.

The assembly is furthermore provided with a compression spring 24 which fits on to the terminal portion 12 of the draw rod 8 and an abutment, constituted in this embodiment by a clevis-type clip 25 insertable into the rear shank portion 1B via an aperture 26 which serves to retain the spring in a compressed condition.

As seen in FIG. 3 initial assembly of the cutting tool takes place as follows:

The draw rod 8 is introduced via its terminal portion 12 into the shank 1 through the open end of the front shank portion 1A. The body member 15 is introduced into the rear shank portion 1B via its open end. The draw rod is thereupon screwed into the threaded bore 16 of the body portion until its terminal portion 12 projects therefrom. At the same time, the screw 23 is introduced through the bore 22A so that its tip is located within the groove 21, thereby delimiting rotation of the body portion 15 and the displaceability of the body member 15 towards the terminal edge of the front shank portion 1A. The spring 24 is inserted into the rear shank portion 1B, is held compressed and the clip 25 is then inserted into the rear shank portion 1B through the aperture 26 and is clipped on to the terminal portion 12 of the draw rod 8, maintaining the spring 24 in its compressed condition. Preferably the rotation of the body member 15 into a position wherein the groove 21 is located opposite the bore 22A, and the compression of the spring 24 prior to insertion of the clip 25 is effected using a dedicated prong-like key (not shown).

In this condition, with the body member 15 and the draw rod 8 biased outwardly by the compression spring 24, the radial abutment wings 9 project slightly beyond the terminal edge of the front shank portion 1a. The cutting head 2 can now be placed in position wherein the coupling end 9A of the draw rod 8 passes through the cavity 6A and the abutment wings 9 pass between adjacent support wings 7. The cutting head 2 is then rotated until the keying projections 4 enter the keying recesses 5 and in this position, the cutting head 2 is retained against withdrawal by the bayonet-type fitting of the abutment wings 9 over the support wings 7.

If now the screw 23 is screwed inwardly against the surface of the groove 21 of the body member 15, the latter is displaced in a direction away from the cutting head 2 against the biasing force exerted by the compression spring 24, thereby drawing the co-directionally displaceable draw rod 8 inwardly and effectively clamping the cutting head 2 against the terminal edge of the front shank portion 1A, the inter-engagement of the projections 4 of the cutting head 2 in the grooves 5 of the front shank portion 1A effectively keying the cutting head 2 against rotation. Due to the bayonet-type fitting of the abutment wings over the support wings, inwardly drawing rod 8 axially displaces the abutment wings so as to clampingly abut the support wings connected to the cutting head 2.

In this way, almost none of the torque forces exerted on the cutting head 2 during the cutting operation are transmitted to the draw bar 8 but instead are taken up by the much more massive front shank portion 1A.

When it is now required to replace the cutting head 2, all that is required is to unscrew slightly the screw 23, thereby releasing the body member 15 for slight displacement under the influence of the compression spring 24 in the direction of the cutting head 2, whereupon the cutting head 2 is displaced away from the grooved end of the front shank portion 1a and can be readily released by a simple rotational movement and detached from the draw rod 8. This replacement of the cutting head can be effected using one band without the necessity to remove the screw 23 from the shank. This is clearly distinctly advantageous when compared with prior art tools which require two-handed operation and the requirement to safeguard against loss of the wholly removed small securing screw.

The provision of the axially displaceable body member 15 with an opposite pair of substantially planar side surfaces 19 allows for the passage of cooling fluid through the rear shank portion 1B in the regions between the planar side surfaces 19 and the inner surface of the rear shank portion 1B. The cooling fluid carries on through the front shank portion 1A to the cutting head 2.

In the embodiments shown in FIGS. 6 through 10 of the drawings, the cutting tool comprises a shank 31 having a tubular front shank portion 31A formed integrally and coaxially with a hollow, cylindrical rear shank portion 31B, the front shank portion 31A being of significantly lesser radial dimensions than those of the rear shank portion 31B. Extending through diametrically opposite portions of the cylindrical wall of the rear shank portion 31B are bores 32A and 32B, communicating with the inner cylindrical hollow region 33 of the rear shank portion 31B. The bore 32A is internally threaded.

Figure 6:
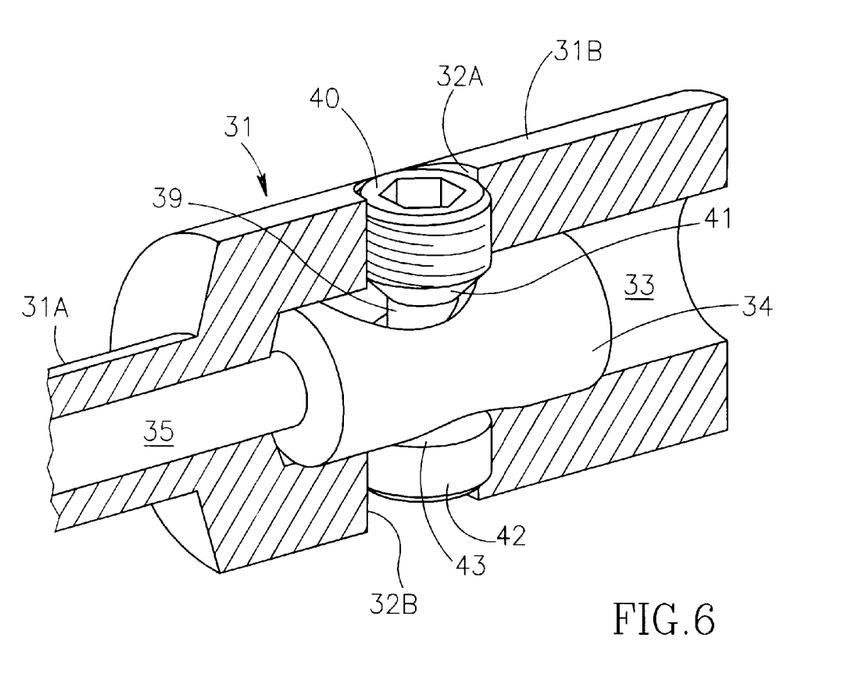
FIG. 6 is a longitudinally sectioned perspective view of a part of a modified form of cutting tool assembly in accordance with the present invention constituting a miniature cutting tool.
Figure 10:
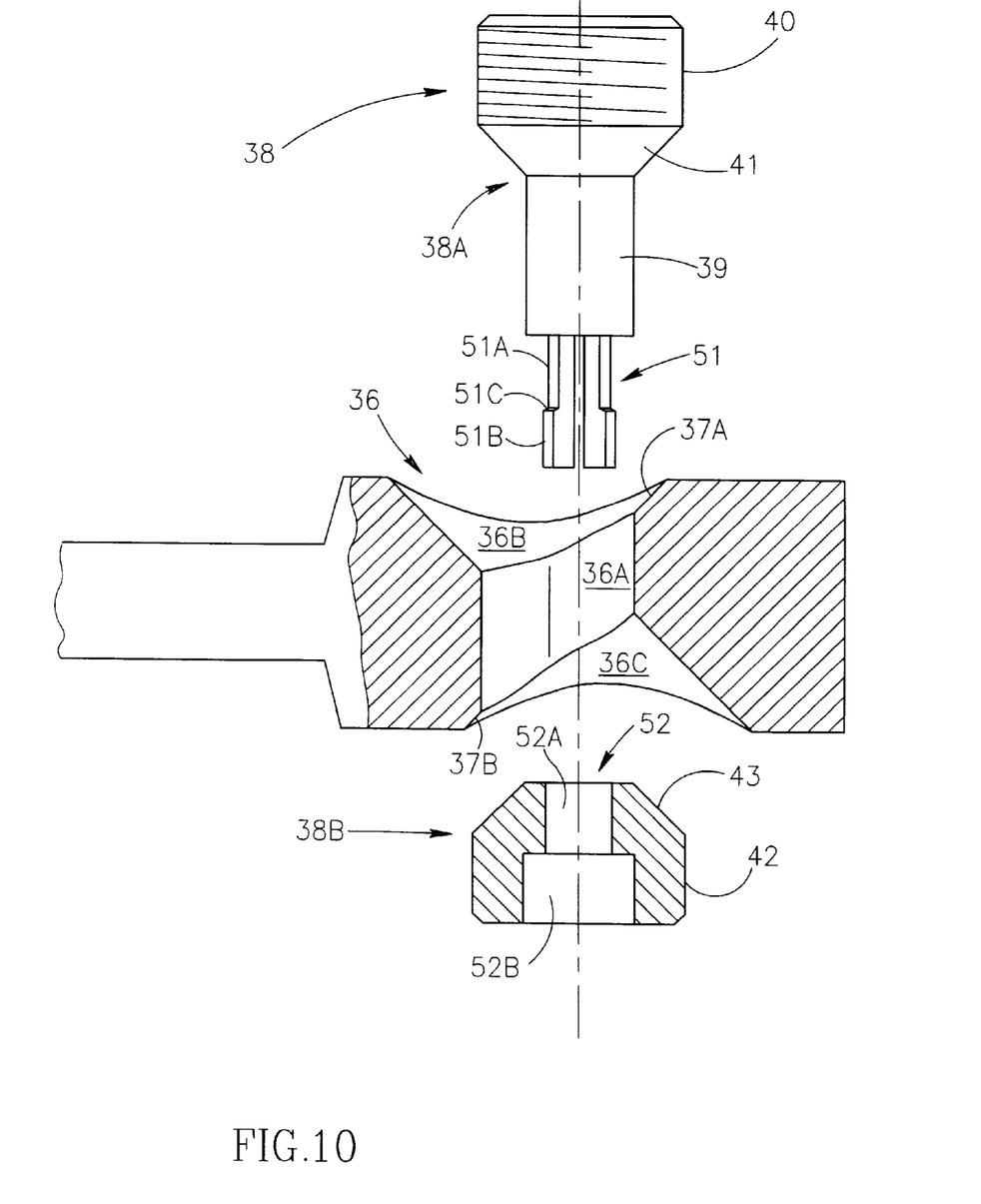
FIG. 10 is a side elevation, partially longitudinally sectioned exploded view of the cutting tool assembly shown in FIG. 6.

An elongated, substantially cylindrical, body member 34 is axially slidable in the region 33 within the shank 31 and is coupled integrally at the end thereof closest to the front shank portion 31A with an elongated draw rod 35 which corresponds in shape and function with the draw rod 8 described with reference to the preceding drawings.

A transversely directed throughgoing bore 36 is formed in the body member 34, having a pair of oppositely sloping cam follower surfaces 37A and 37B, which form part of the defining surfaces of the throughgoing bore 36.

Essentially, and as can be seen most clearly, for example, in FIG. 10 of the drawings, the throughgoing bore 36 comprises a central portion 36A and upper and lower pseudo conical portions 36B and 36C respectively, which are essentially asymmetrically disposed with respect to the central portion 36A, with the surfaces 37A and 37B partially defining the pseudo conical recesses 36B and 36C.

Screw actuating means 38 comprises a cylindrical, connecting central portion 39 having an upper screw threaded portion 40 which is formed integrally with the central portion 39 via a conically tapering portion 41, and a lower cylindrical portion 42 having a conically tapering portion 43.

As seen most clearly in FIGS. 6 to 10 of the drawings, the screw actuating means 38 is located within the rear shank portion 31B, with the upper screw threaded portion 40 screw threadingly fitted within the screw threaded bore 32A and the lower cylindrical portion 42 slidingly fitted within the bore 32B. The central portion 39 is located within the central portion 36A of the throughgoing bore 36 with the conical surface of the conically tapering portion 41 (constituting a cam surface) bearing against the sloping cam follower surface 37A and the conical surface of the conically tapering portion 43 (constituting a cam surface) bearing against the sloping cam follower surface 37B.

Figure 7:
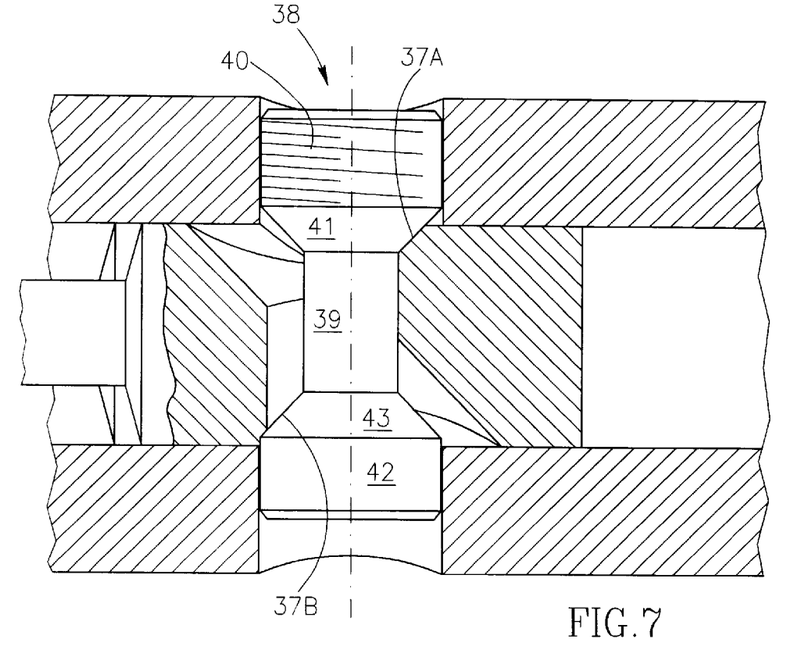
FIG. 7 is a longitudinally sectioned side view of the portion of the cutting tool assembly shown in FIG. 6.

When the screw actuating means 38 has been screwed outwardly into the position shown in FIG. 7 of the drawings, the cam follower surface of the conically tapering portion 43 bears against the cam surface 37B and gives rise to a leftwardly directed movement of the body member 34 and a consequent displacement of the cutting head 2 from the adjacent surface of the front shank portion 1A (not shown in this figure).

Figure 8:
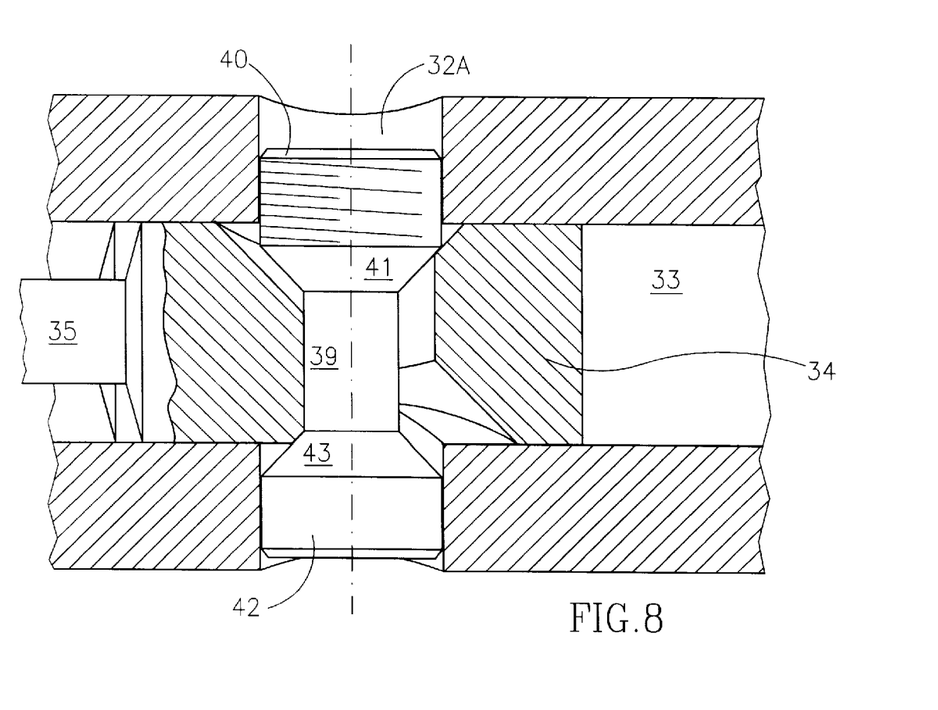
FIG. 8 is a view corresponding to that shown in FIG. 7 with an axially displaceable body thereof shown in the Figure as being displaced to the right.

When, however, the screw actuating member is screwed inwardly into the position shown in FIG. 8, the cam follower surface of the conically tapering portion 41 bears on the sloping cam surface 37A, causing the body member 34 to move to the right, with a consequently rightwardly directed movement of the draw rod 35 which, in its turn, gives rise to effective clamping of the cutting head against the adjacent surface of the front shaft portion 1A.

Figure 9:
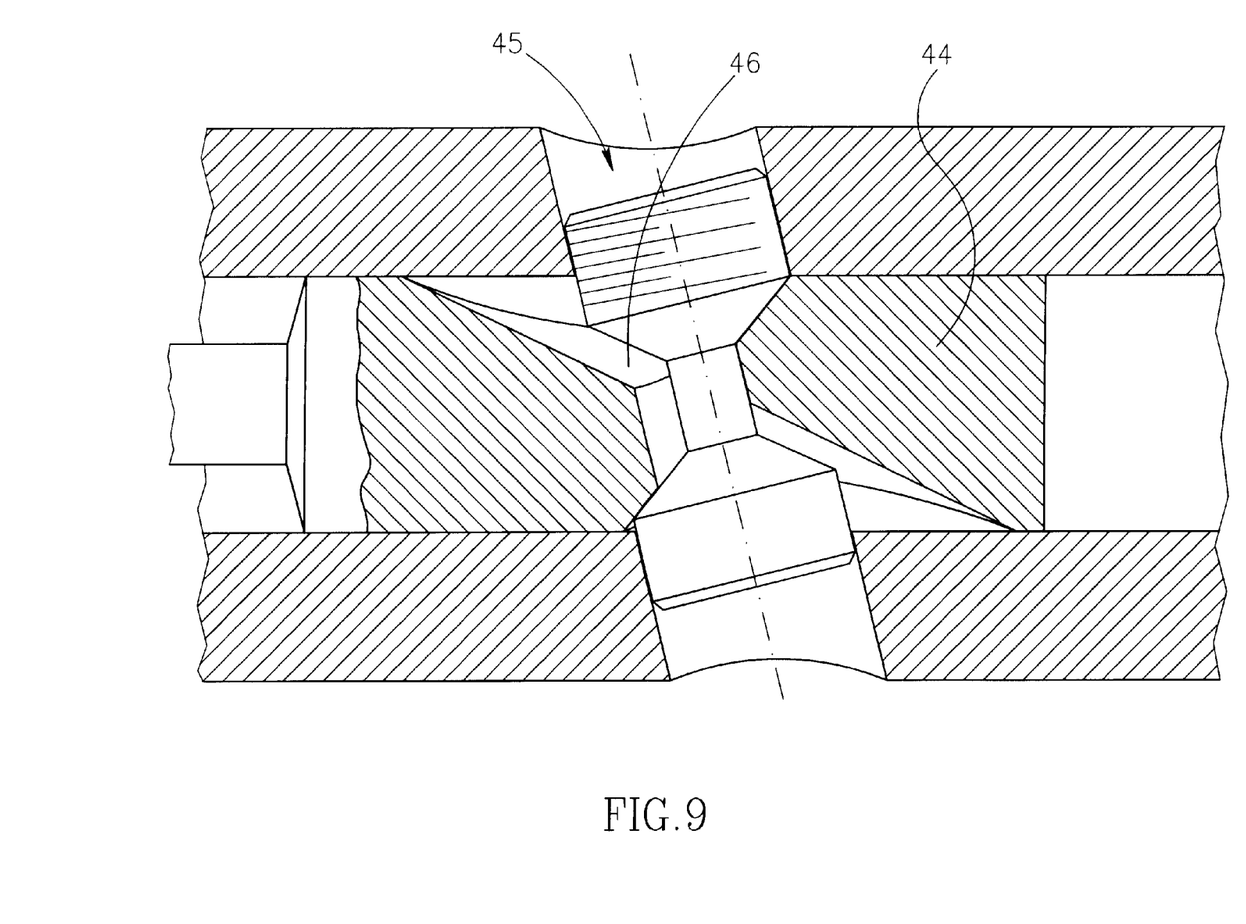
FIG. 9 is a longitudinally sectioned view of part of a still further modified form of cutting tool assembly in accordance with the present invention constituting a cutting tool.

In an alternative embodiment shown in FIG. 9 of the drawings, the basic construction of an axially displaceable body 44 and a screw adjusting member 45 are the same as previously described with reference to FIGS. 6, 7, 8 and 10, but in this case both a transverse bore 46 in the displaceable body 44 and the screw adjusting member 45 are disposed at an acute angle with respect to the longitudinal axis of the tool, the advantage here being that readier access can be had to the screw adjusting member 45 for rotation thereof and consequent displacement of the body 44. Furthermore, in this embodiment, the screw adjusting member 45 exerts greater axial force on the body 44 and causes greater axial displacement thereof.

Reference will once more be made to FIG. 10 of the drawings for a more detailed description of the construction, mode of assembly and insertion of the screw actuating means 38 into the rear shank portion 31B in general, and through the body member 34 in particular.

As seen in FIG. 10, the screw actuating means 38 is essentially formed of two separate component parts 38A and 38B, wherein a first component part 38A consists of the upper screw threaded portion 40, the conically tapering portion 41 and the central portion 39, from which depends integrally a split coupling pin 51 having upper and lower portions 51A and 51B respectively, with the lower portion 51B being of slightly extended radial dimensions as compared to the upper portion 51A and merging therewith via a shoulder 51C.

The second component 38B consists of the lower cylindrical portion 42 and the tapering portion 43 having a central bore 52 consisting of upper and lower portions 52A and 52B, with the lower portion 52B being of larger radial dimensions than the portion 52A, the axial extent of the portion 52A being not larger than the axial extent of the portion 51A of the coupling pin 51.

For the purpose of assembly, the axially displaceable body member 34 is located within the region 33 (see FIG. 6) of the rear shank portion 31B, with the throughgoing bore 36 thereof opposite the diametrically opposed bores 32A and 32B formed in the rear shank portion 31B. The screw actuating component part 38A is introduced into the rear shank portion 31B via the bore 32A, and through the transverse bore 36 and the coupling pin 51 thereof snapped into position within the second screw actuating component 38B. It is, however, clear that other equivalent means can be employed for assembling the screw actuating means 38.

The means just described with reference to FIGS. 6 to 10 of the drawings can be used for selective displacement of a cutting head into and out of clamping engagement with an adjacent surface of a front shank portion irrespective of the manner in which the cutting head is secured to the associated draw rod.

The invention as specifically described hitherto by way of example with respect to the illustrated embodiments can equally well be applied to miniature cutting tools for both internal and external machining.

The cutting tool assemblies just described by way of example are all characterized by the provision of displacement arrangements which, whilst of particular significance in relation to the effective releasable coupling and clamping of a cutting head in a tool holder, can be readily adapted for use, for example, in tools of other kinds for effecting controlled limited displacement of tool components.

What is claimed is:

1. A cutting tool assembly having a longitudinal axis and comprising a cutting head releasably retained by a tool holder, said cutting head having a cutting portion and a coupling member integrally formed therewith and said tool holder being provided with a coupling member for interacting with the coupling member of the cutting head, the coupling member of the cutting head being formed within an open-ended cavity, the coupling member of the tool holder having a plurality of radially extending abutment wings, and the coupling member of the cutting head having a corresponding set of spaced apart, peripherally located, radially directed support wings, the arrangement being such that a retaining coupling of said cutting head to said tool holder is effected upon insertion of the coupling member of the tool holder into the cavity of the cutting head with said abutment wings passing respectively between successive support wings, rotating said cutting head until said abutment wings are aligned with and overlie said support wings and axially displacing the coupling member of the tool holder relative to the cutting head in a direction towards the tool holder until said abutment wings clampingly abut said support wings.

2. A cutting tool assembly according to claim 1, wherein the coupling member of the tool holder is mounted in the tool holder so as to be axially displaceable with respect thereto, the retaining coupling of the cutting head in the tool holder being achieved as a result of an inward axial displacement of the coupling member of the tool holder, there being furthermore provided displacing means for inward and outward axial displacement of said coupling member of the tool holder.

3. A cutting tool assembly according to claim 1 or 2, wherein said radially directed support wings are formed on an inner wall of said open-ended cavity of the cutting head.

4. A cutting tool assembly according to claim 2, wherein said displacing means comprises a screw member screw-mounted in said tool holder so as to act on said coupling member of the tool holder, whereby screw rotation of said screw member in opposite senses results in said oppositely directed axial displacements of said coupling member of the tool holder.

5. A cutting tool assembly according to claim 1 comprising integrally formed rear and front hollow shank portions, the front shank portion being elongated and having a smaller radial dimension than that of the rear shank portion;

said cutting head being releasably centered and keyed against rotation with respect to a free end of said front shank portion;

said coupling member of the tool holder comprising an elongated draw rod extending through said front shank portion for bayonet-type coupling at one end thereof to said cutting head whereby said abutment wings clampingly abut said support wings, the draw rod being rigidly coupled at an opposite end thereof to a displaceable body slidably located in said rear shank portion so as to be co-directionally displaceable with said draw rod in an axial direction of said rear shank portion;

said displacing means comprising a screw member screw mounted in a portion of said cutting tool rearward of said front shank portion so as to bear on said displaceable body so that screw rotation of said screw member means in opposite senses results in displacement of said displaceable body respectively away from and towards said cutting head so as respectively to clamp and release said cutting head to and from said front shank portion.

6. A cutting tool assembly according to claim 5, wherein the screw member is screw mounted in an intermediate portion of said cutting tool and wherein spring biasing means is provided to spring bias said displaceable body towards said cutting head into releasing said cutting head from said front shank portion and wherein said screw member has an inner end bearing on said displaceable body so that inwardly directed screw rotation of said screw member imparts to said displaceable body a displacement away from said cutting head and against the spring biasing.

7. A cutting tool assembly according to claim 6, wherein a grooved portion is formed in a leading end of said displaceable body, the inner end of the screw member fitting into the grooved portion.

8. A cutting tool assembly according to claim 6, wherein
  said displaceable body is screw mounted on said draw rod with a portion of said draw rod projecting beyond said displaceable body, and
  the assembly further comprises a compression spring mounted on the portion of said draw rod projecting beyond said displaceable body, a first end of the compression spring bearing on said displaceable body and a second end of the compression spring bearing on an abutment member fixed with respect to said rear shank portion.

9. A cutting tool assembly according to claim 8, wherein said abutment member comprises a clip transversely insertable into said rear shank portion so as to engage the portion of said draw rod projecting beyond said displaceable body.

10. A cutting tool assembly according to claim 5, wherein
  said displaceable body is formed with a transversely extending cavity having sloping cam follower surfaces located at transversely spaced apart locations of said cavity; and wherein
  said screw member is mounted in said rear shank portion and is provided with an elongated cam member extending through said cavity, said cam member being formed at transversely spaced apart locations thereof with oppositely sloping cam surfaces in respective sliding relationship with said cam follower surfaces, said screw member being screw displaceable inwardly and outwardly in said cavity so as to give rise to relative sliding displacements of juxtaposed pairs of cam and cam follower surfaces with consequent displacement of the displaceable body away from and towards the cutting head.

11. A cutting tool assembly according to claim 10, wherein said cam follower surfaces respectively define a pair of transversely spaced apart conical recesses included within said cavity and wherein said cam surfaces comprise a pair of transversely spaced apart conical surfaces of said cam member.

12. A cutting tool assembly according to claim 10, wherein one of said conical surfaces is formed on a detachable cam member component which is releasably coupled to the remaining portion of the cam member.

13. A cutting tool assembly according to claim 10, wherein one end portion of said cam member is formed with screw threading so as to screw engage with an internally threaded bore of said rear shank portion.

14. A cutting tool assembly according to claim 5, wherein adjacent surfaces of said cutting head and front shank portion are respectively formed with inter-engaging recess and projection means so as to ensure that said cutting head is releasably centered and keyed against rotation with respect to a free end of the front shank portion.

15. A displacement mechanism comprising:
  a casing having an inner hollow region;
  an axially displaceable body member slidably located in said inner hollow region;
  a displacement member coupled to said body member;
  a transversely directed throughgoing bore formed in said body member, the throughgoing bore comprising upper and lower portions separated by a central portion, said upper and lower portions being partially defined by first and second sloping cam follower surfaces, respectively, said upper and lower portions and said first and second sloping cam follower surfaces being asymmetrically disposed with respect to the central portion, the first and second cam follower surfaces being located at transversely spaced apart locations of said cavity and having oppositely sloping surfaces;
  an elongated cam member extending through said throughgoing bore and being formed at transversely spaced apart locations thereof with sloping cam surfaces in respective sliding relationship with said cam follower surfaces; and
  screw means for selectively displacing said cam member into and out of the throughgoing bore so as to displace the body member in opposite axial directions within the hollow region.

16. A displacement mechanism according to claim 15, wherein said cam follower surfaces respectively define a pair of transversely spaced apart conical recesses included within said cavity and wherein said cam surfaces comprise a pair of transversely spaced apart conical surfaces of said cam member.

17. A displacement mechanism according to claim 15, wherein one of said conical surfaces is formed on a detachable cam member component which is releasably coupled to the remaining portion of the cam member.

18. A displacement mechanism according to claim 15, wherein
  the casing is provided with bores extending through diametrically opposite portions thereof, said bores communicating with said inner hollow region, at least one of said bores being threaded, and
  one end portion of said cam member is formed with screw threading so as to screw engage with said threaded bore.

19. A displacement mechanism according to claim 16, wherein said casing is substantially cylindrical.

20. A cutting tool assembly according to claim 1, wherein said cutting head comprises a cylindrical body portion, the cutting portion being formed on an outer wall thereof and the radially directed support wings being formed on an inner wall thereof.

21. A cutting tool assembly comprising, in combination:
  a tool holder having a longitudinal axis, the tool holder comprising a first coupling member provided with a plurality of radially extending abutment wings; and
  a cutting head having a cutting portion and a second coupling member integrally formed therewith, the second coupling member being formed with a cavity and having a set of spaced apart, peripherally located, radially directed support wings within said cavity, wherein the radially extending abutment wings have a peripheral extent which allows them to pass between said radially directed support wings, when the first and second coupling members are brought towards each other along the longitudinal axis; and
  wherein the first and second coupling members are configured to releasably retain the cutting head on the tool holder, a retaining coupling of the cutting head to the tool holder being effected upon movement of at least one of the coupling members towards the other along the longitudinal axis until the abutment wings pass between the support wings, rotation of the cutting head relative to the first coupling member until said abutment wings overlie said support wings, and axial displacement of the first coupling member along the longitudinal axis, until the abutment wings clampingly abut the support wings and secure the cutting head to the tool holder.

22. A cutting tool assembly according to claim 21, wherein the cutting head is provided with a plurality of projections configured to seat the cutting head onto complementary recesses formed on the tool holder.

23. A cutting tool assembly according to claim 21, wherein the cutting head comprises a cylindrical body portion, the cutting portion and the first coupling portion of the cutting head being formed on said cylindrical body portion.

24. A cutting tool assembly according to claim 23, wherein the peripherally located, radially directed support wings are formed on an inner wall of the cylindrical body portion.

25. A cutting tool assembly according to claim 21, wherein the tool holder comprises:
   a hollow shank, and
   a rod member releasably retained in the hollow shank and having first and second ends, the first end of the rod member projecting from the hollow shank, wherein the first coupling portion is provided on said first end.

26. A cutting tool assembly according to claim 25, wherein
   the tool holder's hollow shank comprises integrally formed rear and front shank portions with the first end of the rod member emerging from the front shank portion, the front shank portion having a smaller radial dimension than that of the rear shank portion.

27. A cutting tool assembly according to claim 26, wherein the tool holder further comprises:
   a displaceable body slidably located in the rear shank portion and configured to move in an axial direction therein, the displaceable body being coupled to the rod member such that the displaceable body and rod member move together; and
   a screw extending through at least one wall of the hollow shank and abutting said displaceable body, said screw being arranged such that turning the screw in a first direction causes the displaceable body and rod member to move in a direction away from the cutting head to thereby clamp the cutting head to the tool holder, and turning the screw in a second opposite direction causes the displaceable body and the rod member to move in a direction towards the cutting head to thereby release the cutting head from the tool holder.

28. A cutting tool assembly according to claim 27, further comprising a spring biasing the displaceable body and the rod member towards the cutting head, and wherein turning the screw inwards compresses the spring and clamps the cutting head to the tool holder, and turning the screw outwards relaxes the spring and releases the cutting head from the tool holder.

29. A cutting tool assembly according to claim 28, wherein a groove is formed in the displaceable body, the screw abutting the groove of the displaceable body.

30. A cutting tool assembly according to claim 28, wherein
   the displaceable body is screw mounted to said rod member with the second end of the rod member projecting beyond the displaceable body, and
   the spring is a compression spring mounted on the rod member proximate to the second end, the compression spring being compressed between the displacement member and an abutment surface fixed in place with respect to the rear shank portion.

31. A cutting tool assembly according to claim 30, wherein
   the abutment surface is provided by a clip transversely inserted into the rear shank portion.

32. A cutting tool assembly according to claim 27, wherein
   the displaceable body is formed with a throughgoing bore having first and second sloping cam follower surfaces located at transversely spaced apart locations of said throughgoing bore; and
   the screw is positioned in the throughgoing bore and is provided with a first cam surface in abutment with the first cam follower surface, a lower portion of the screw being received into a detachable cam member component provided with a second cam surface in abutment with the second cam follower surface, the screw being screw displaceable inwardly and outwardly in said throughgoing bore so as to cause said cam surfaces to slide relative to said cam follower surfaces and thereby urge the displaceable body away from and towards the cutting head, respectively.

33. A cutting tool assembly according to claim 32 wherein said cam follower surfaces respectively define a pair of transversely spaced apart conical recesses included within said throughgoing bore and wherein said cam surfaces comprise a pair of transversely spaced apart conical surfaces.

34. A method of assembling a cutting tool comprising:
   providing a tool holder having a longitudinal axis, the tool holder comprising a first coupling member provided with a plurality of radially extending abutment wings;
   providing a cutting head having a cutting portion and a second coupling member integrally formed therewith, the second coupling member being formed with a cavity and having a set of spaced apart, peripherally located, radially directed support wings within said cavity; wherein the radially extending abutment wings have a peripheral extent which allows them to pass between said radially directed support wings, when the first and second coupling members are brought towards each other along the longitudinal axis;
   positioning the tool holder and the cutting head in a spaced apart arrangement, alone the longitudinal axis;
   moving at least one of the tool holder and the cutting head towards the other along the longitudinal axis until the abutment wings pass between the support wings;
   rotating one of the tool holder and the cutting portion until the abutment wings and the support wings overlie one another, when viewed along the longitudinal axis; and
   moving the first coupling member along the longitudinal axis, until the abutment wings clampingly abut the support wings and secure the cutting head to the tool holder.

* * * * *